US00H002067H

(19) United States

(12) Statutory Invention Registration

Parise et al.

(10) Reg. No.: US H2067 H

(43) Published: Jun. 3, 2003

(54) CUTTING METALLATES OF REFRACTORY METALS

(75) Inventors: Anthony V. Parise, Nashua, NH (US); Bruce A. Coffin, Melrose, MA (US)

(73) Assignee: H. C. Stark, Inc., Newton, MA (US)

(21) Appl. No.: 09/177,181

(22) Filed: Oct. 22, 1998

(51) Int. Cl.[7] ..... B28D 1/02

(52) U.S. Cl. ..... 451/28; 451/53; 125/13.01

(58) Field of Search ..... 451/28, 53, 450, 451/41; 125/13.01, 13.02, 11.22

(56) References Cited

U.S. PATENT DOCUMENTS 5,447,466 A * 9/1995 Wang et al. ..... 451/450
5,743,120 A * 4/1998 Balliett ..... 72/42
5,839,311 A * 11/1998 Grenfell et al. ..... 72/42
6,043,201 A * 3/2000 Milbrath et al. ..... 508/582

* cited by examiner

*Primary Examiner*—Robert A. Rose

(74) *Attorney, Agent, or Firm*—Jerry Cohen

(57) ABSTRACT

Lithium niobate and tantalate crystal rods or boules are sawed to wafers with diamond edged saws in the presence of inert fluorinated lubricating liquids.

8 Claims, 18 Drawing Sheets

(18 of 18 Drawing Sheet(s) Filed in Color)

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

CUTTING METALLATES OF REFRACTORY METALS

FIELD AND BACKGROUND OF THE INVENTION

The present invention relates to methods and apparatus for the saw cutting and other cutting of metallates of refractory metals including: niobates, tantalates, titanates, and more particularly crystals of lithium niobate and lithium tantalate and to fluids used for friction reduction, swarf removal and/or cooling in such processes ("lubricating fluids").

Several Ta, Nb, Ti metallates have found significant usage as materials for manufacture of solid state power, signal translation, transducing and sensing devices, including usage as filters, resonators, delay lines, piezoelectric transducers. They are also useful in connection with the making of perskovite structure ceramics, including the so-called PMN types (e.g., lead-magnesium-niobate, with well-known substitutions for each such nominal component) useful for ferroelectric and dielectric properties.

The class of metallates involved here is glasslike materials available and usable in polycrystalline and single crystalline and in amorphous forms, usually grown or refined as single crystals by Czochralski process pulling and growth from a melt or Pfann zone refining process. The crystal boules or rods vary from a few cm to well over a foot in diameter. It is desirable for most usage purposes to cut them into wafer thin slices, with dimensional control, achieve very thin sections, avoid excessive kerf and swarf, suppress impurity pick-up, suppress surface wear and roughness, recycle swarf and avoid breakage or crystalline or mechanical structural flaws of the wafer to a high degree. Maintaining cutting tool life and precision, and control of lubricant waste and disposal are also important criteria.

The principal cutting method presently used for such materials is sawing using rotary metal blades with an edge coating composite of diamond particles in a polymeric or metal blade matrix (diamond saw), using water-soluble or emulsifible oils (in aqueous solutions or emulsions) as lubricants for cooling, removal of swarf and friction reduction. Sometimes water, per se or with minimal functional additives, is used as the lubricant. Generally a wafer thickness as low as 0.5 mm is achievable. Cutting is followed by deionized water rinsing of the wafers, and air drying, to further remove swarf and residual lubricant. Filtering is used to recover the swarf particles (often sub-micron sized) and the lubricant is recycled or disposed in an environmentally sound way, at a significant cost.

The objects of the present invention are to provide improved method, apparatus and lubricant systems and materials to enhance blade life and precision, enable greater speed of cutting, reduce swarf and other waste, reduce wear and roughness of the wafer surfaces, eliminate subsequent water rinsing, increase yields and/or reduce the thickness level regularly achievable with the metallate materials, particularly lithium niobates and tantalates, as well as reducing costs.

SUMMARY OF THE INVENTION

The objects of the invention are realized through method and apparatus employing a class of lubricants and systems for their utilization in the present context that can be recycled without complex or expensive reconstitution, cools more effectively than state of the art lubricants and enables closer control of the cutting. The invention can also be extended to other operations concerning the metallates including surface grinding and polishing, as well as the cutting of strips and dice from the wafer slices. It has been found that diamond blade wear can be reduced remarkably—to a degree that useful blade life is extended manyfold, that rpm, tool infeed rate and thereby speed of cutting can be increased.

The preferred processes and machines employ a lubricant comprising one or more of: (a) perfluorocarbon compounds (PFCs), including aliphatic perfluorocarbon compounds (α-PFCs) having the general formula $C_nF_{2n+2}$, (b) perfluoromorpholines (PFMs) having the general formula $C_nF_{2n+1}ON$, (c) certain perfluoroamines (PFAs), (d) highly fluorinated amines (HFAs), (e) perfluoroethers and perfluropolyethers (PFEs and PFPEs), (f) hydrofluoro polyethers (HFPEs) and (g) highly fluorinated ethers (HFEs), and their respective polymerization products. Such compounds exhibit a very high degree of thermal and chemical stability due to the strength of the carbon-fluorine bond. PFCs are also characterized by extremely low surface tension, low viscosity, and high fluid density. They are clear, odorless, colorless fluids with boiling points from approximately 30° C. to approximately 300° C. (although the preferred boiling range for refractory metal matellate cutting is 30–200 C., and more preferably, as stated below, 50–150).

Fluorinated, inert liquids usable in accordance with the present invention can be one or a mixture of α-PFC, PFM, PFA, HFA, PFE, PFPE, HFPE and HFE compounds having 5 to 18 carbon atoms or more and having a H:F ratio under 1:1. When any of these choices other than ethers are used, they preferably have a hydrogen content of less than 5% by weight, most preferably less than 1% by weight. When ethers are used, a hydrogen content of less than 2% is the most preferred.

These materials are preferably used in liquid phase and used alone (neat), but in some usages may usefully be mixed or emulsified with other functional or carrier liquids and/or mixed with particulate solids as pastes or waxes. They can also have useful solids suspended therein when used in liquid form.

Suitable fluorinated, inert liquids useful in this invention may include more particularly, for example, perfluoroalkanes or perfluorocycloalkanes, such as perfluoropentane, perfluorohexane, perfluoroheptane, perfluorooctane, perfluoro-1, 2-bis (trifluoro-methyl) hexafluorocyclobutane, perfluorotetradecahydro-phenathrene, and perfluorodecalin; perfluoroamines, such as perfluorotripropylamine, perfluorotributylamine, perfluorotriamylamine perflurotriethylamine, perfluoromorpholines, such as perfluoro-N-methylmorpholine, perfluoro-N-ethylmorpholine, and perfluoro-N-isopropylmorpholine, perfluorophenanthrene and perfluoroethers and perfluoropolyethers, such as perfluorobutyltetrahydrofuran, perfluorodibutylether, perfluorobutoxyethoxyformal, perfluorohexyl formal, and perfluorooctyl-formal, perfluro polyethers and the polymerization products of these classes.

The prefix "perfluoro" as used herein means that all, or essentially all, of the hydrogen atoms are replaced by fluorine atoms. Perfluorocarbon fluids originally were developed for use as heat-transfer fluids. They are currently used in heat-transfer, vapor phase soldering, and electronic testing applications and as solvents and cleaning agents and have also been described in connection with usage in certain shop operations such as: wire drawing, hot and cold bulk forrning, cutting and abrasion processes see, e.g., U.S. Pat.

Nos. 5,676,005 (Oct. 14, 1997) and 5,743,120 (Apr. 28, 1998) and published PCT application WO097/35673 (published Oct. 2, 1997) of H. C. Starck, Inc. (Newton, Mass.), as well as the PCT published PCT applications of D. S. Milbrath et al. of 3M Co. (Minnesota Mining & Manufacturing Co., Inc., St. Paul, Minn.), WO9812286 and 9812287 published Mar. 26, 1998, based on U.S. applications Ser. No. 08/715,207 and 08/715,206 of Sep. 17, 1996.

The term "highly fluorinated" as used herein means having a H:F ratio under 1:1. Commercially available fluorinated, inert liquids useful in this invention include the PF-5062, HFE7100, HFE7200, FC-40 liquids (all available from 3M Company under the trade-name designations of "Fluorinert," performance fluid or hydrofluorether as described in 3M's published PCT patent applications. Other perfluorocarbon liquids such as, HT-200, HT-230 and HT-270 (available from Montefluos Inc., Italy, under the tradename designation of "Galden"); Hostinert™ (Hoechst-Celanese); and Krytox brand K—101, 103, 105, 107 (DuPont) are also usable for purposes of the present invention.

Generally, fluorinated liquids of the invention should be selected for a 50–180° C. boiling point for most metallate grinding and polishing applications: Liquids with higher or lower boiling points are likely to suffer from degraded performance such as lower cutting ability above 3,000 rpm and reduced infeed rates or high loss rates, respectively, over this preferred boiling point range.

The lubricant can be filtered between usages for a defined series of cuts to trap fine particulate swarf from cutting and make the liquid available for reuse, as well as recovery and reuse or proper disposition of the particles. Through the present invention the intervals between filter changes can be extended substantially since there are fewer and smaller particles produced in the practice of the present invention compared to prior practice using aqueous lubricants.

If very low boiling PFC lubricants are used, then the vapors should be condensed and returned to liquid form lubricating usage in the same or a subsequent cycle of cutting. Additionally or alternatively, the work environment can be cooled to limit vaporization. The cutting can be carried out with the diamond wheel initially coated at least at its cutting surface with lubricant and with a nozzle feeding a stream of lubricant to the cut region or blade or with the cutting tool and workpiece all immersed in a bath of the lubricant. After cutting the wafer slices can be, but need not be, washed with non-aqueous cleaning fluids to remove residual fluorinated lubricant. In some instances a clean, inert gas should be blown over the wafer surface to carry away sub-micron particles and aid evaporation of residual lubricant.

Surface roughness of the refractory metal metallates will be substantially less in processing through the present invention compared to state of the art processing. The roughness is expressed in an average of projection heights (in nanometers, nm) determined by scanning probe microscopy (SPM). This technique generates a digital topographic image of the surface of the sample. The vertical movement of the probe is accurately measured by means of a laser and recorded. These data are analyzed to develop a three dimensional representation of the sample's surface and a quantitative measure of the surface roughness at an effective magnification of 1,000X. Smoother samples have a lower surface roughness measurement.

The metallates treatable advantageously through the present invention include niobates, tantalates, titanates, vanadates, hafnates, zirconates, molybdates and tungstates of the metals lithium, barium and other suitable metals.

Other objects, features and advantages of the present invention will be apparent from the following detailed description of preferred embodiments thereof, taken in conjunction with the accompanying figures of the drawing, in which:

DETAILED DESCRIPTION OF PREFERRED EMBODIMENTS

Figure 1:
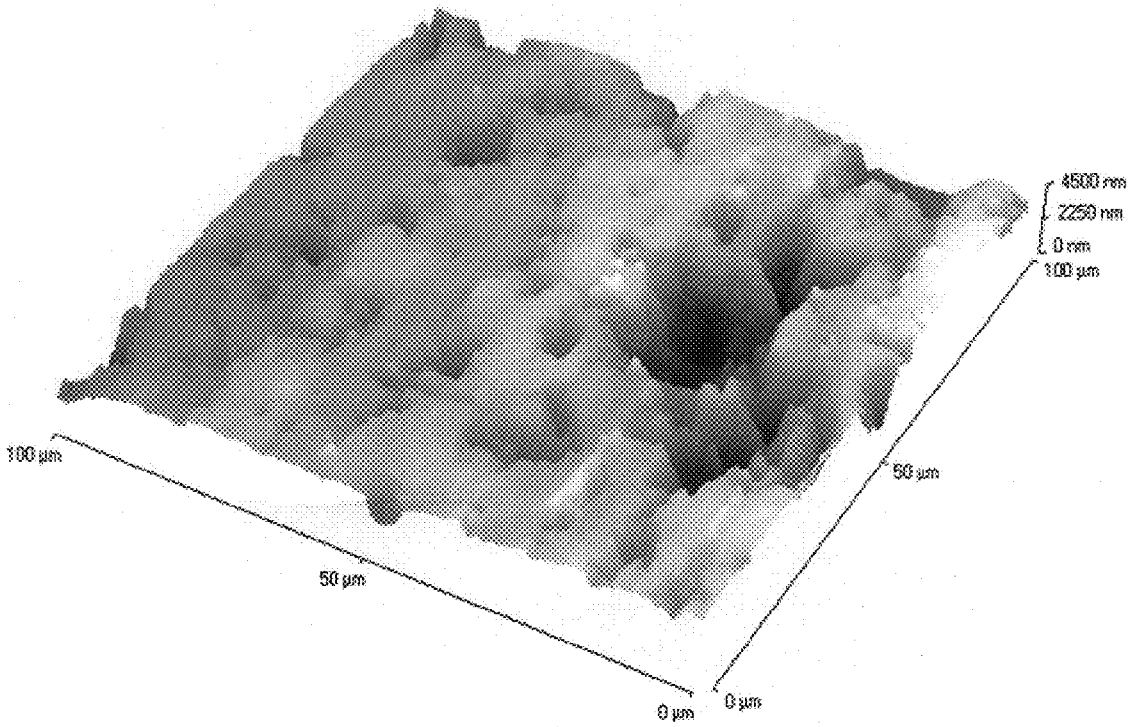
FIGS. 1–3 is an SPM image of a lithium tantalate sample sawed using, respectively, water (prior art) and then perfluorotributylamine and perfluro-N-methylmorpholine per the present invention all at 3,000 rpm and fast feed.
Figure 2:
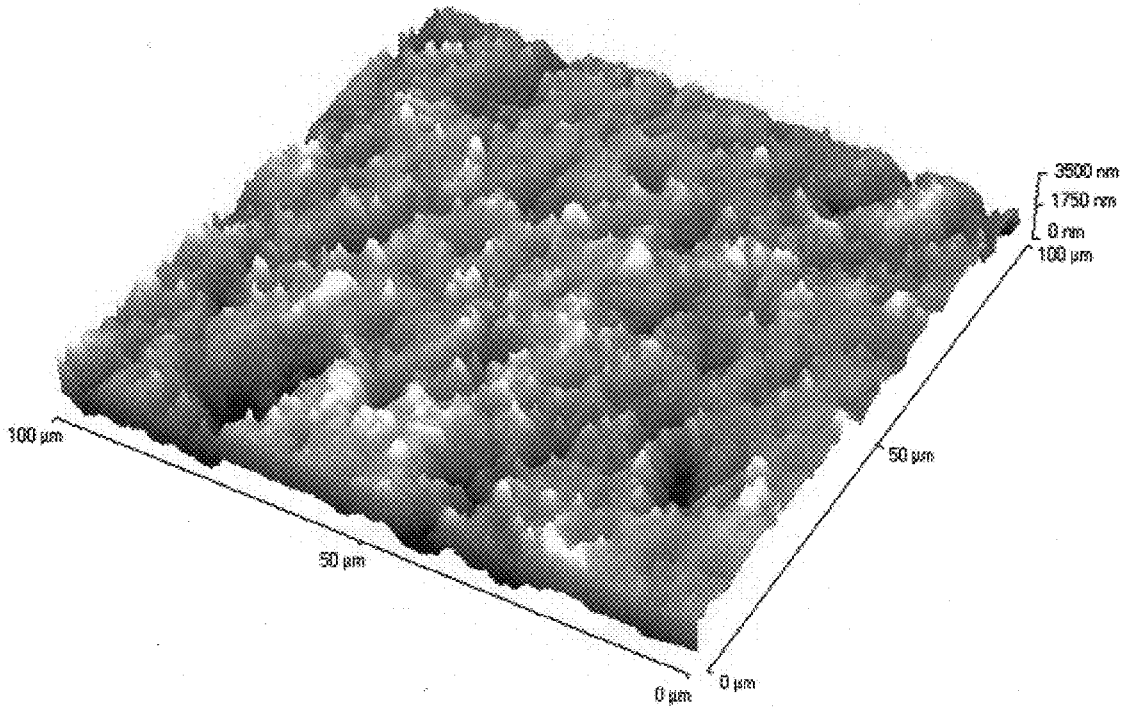
Figure 3:
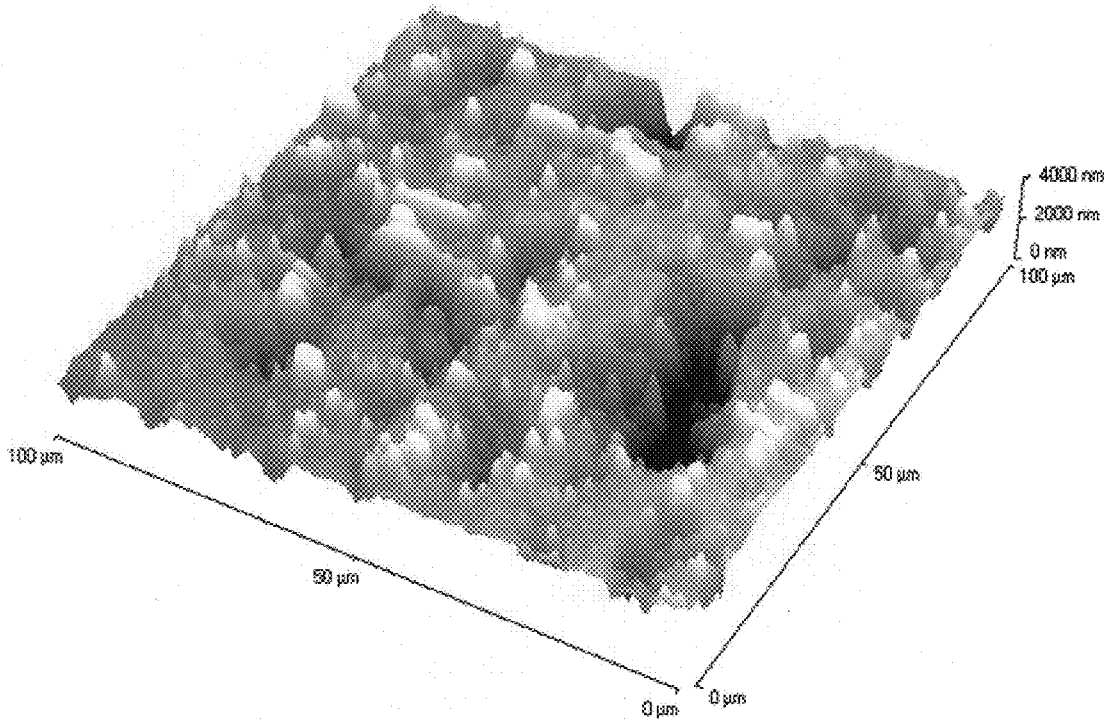
Figure 4:
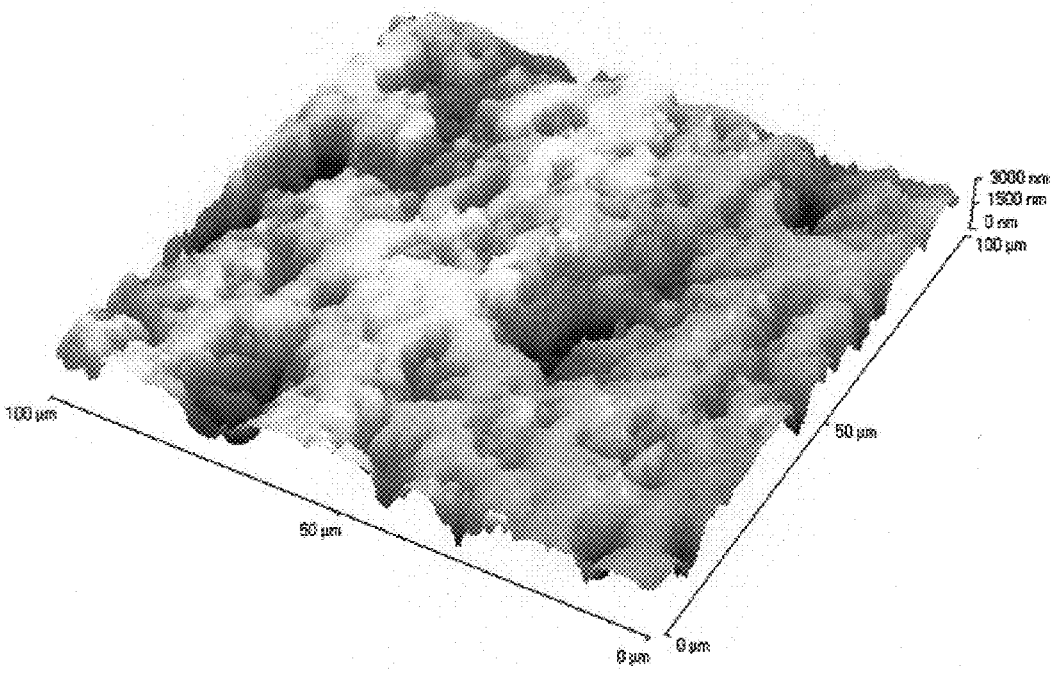
FIGS. 4–6 are a similar SPM runs at slower infeeds, and an addition (FIG. 7) using 1-ethoxy-nonafluoro-butane.
Figure 5:
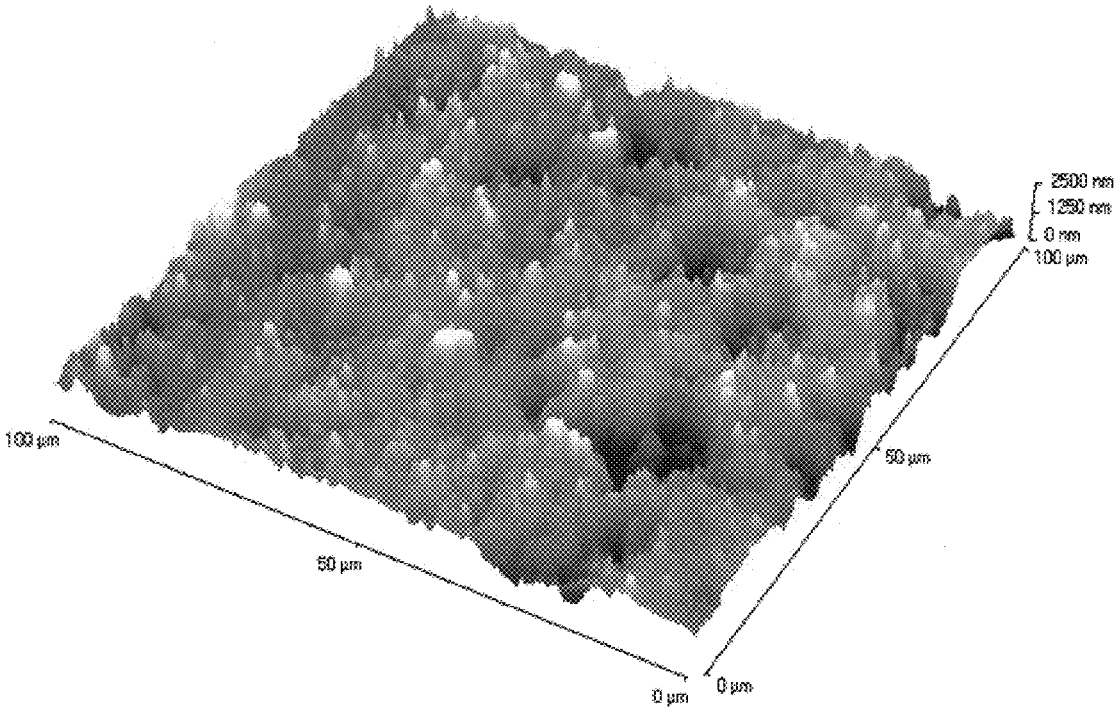
Figure 6:
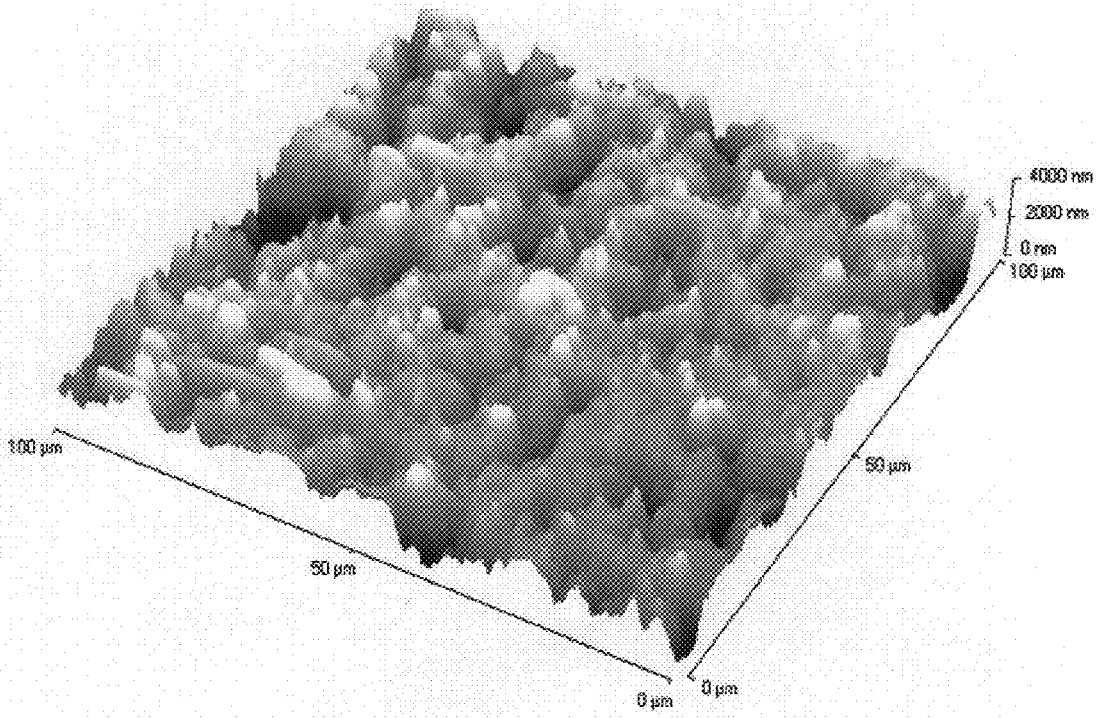
Figure 7:
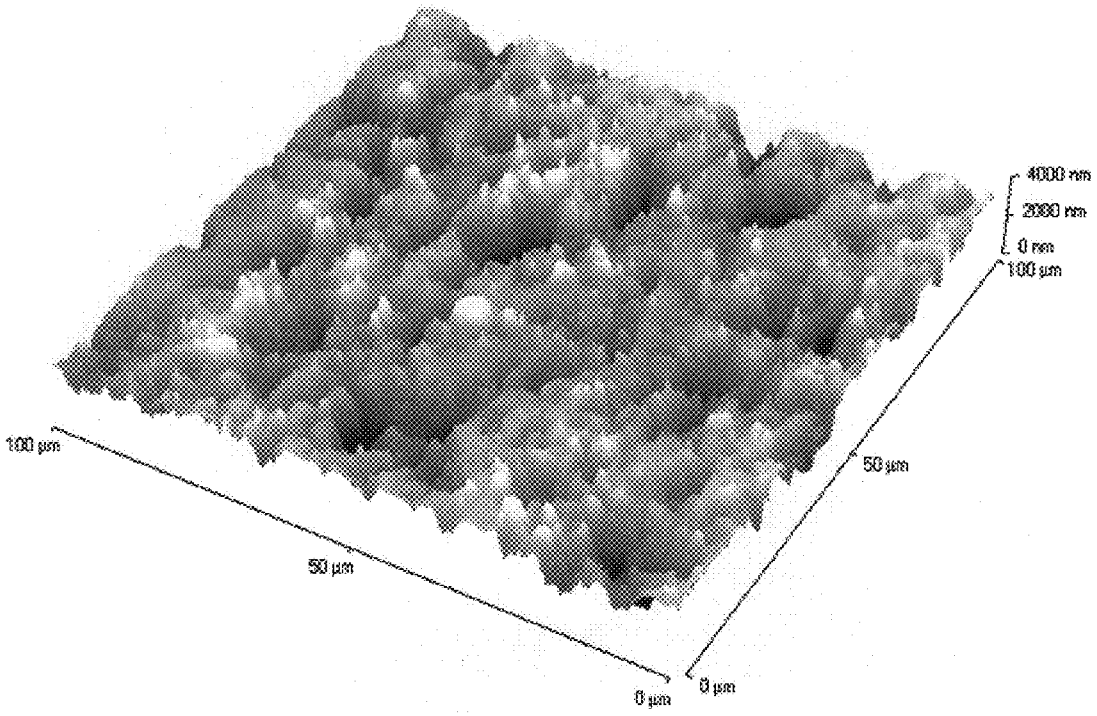
Figure 8:
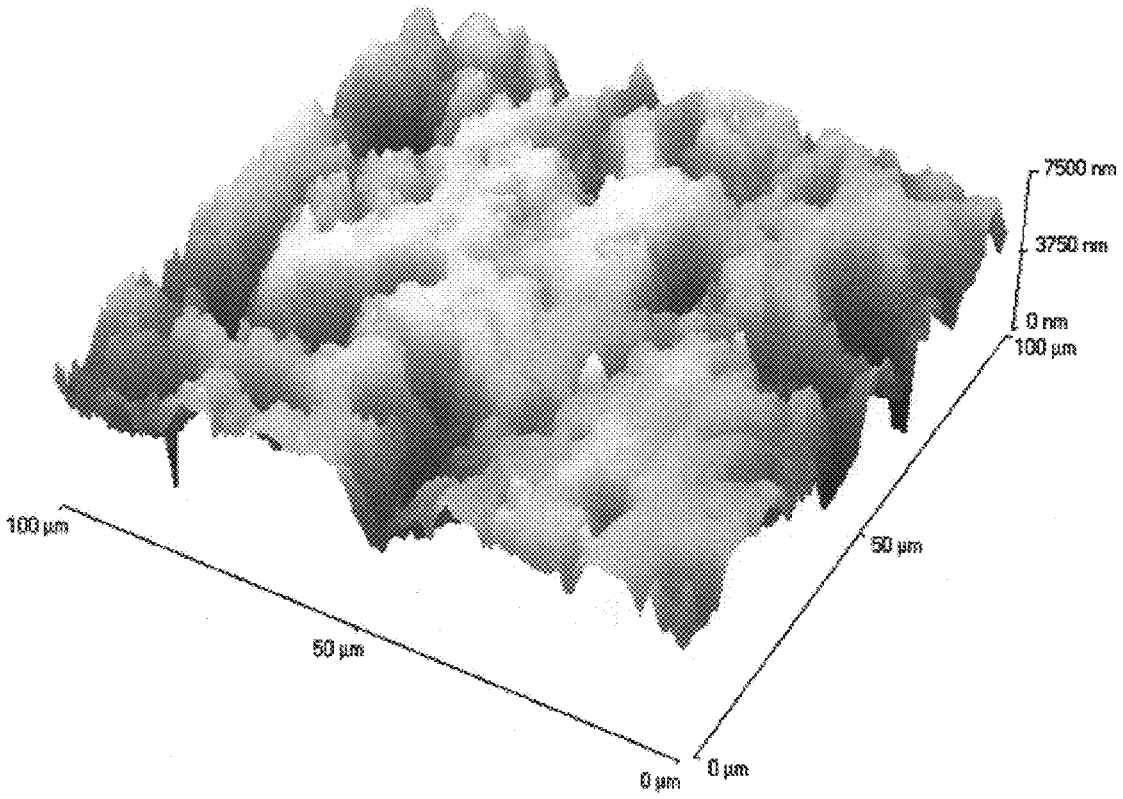
FIGS. 8–13 are a similar SPM series for lithium niobate at high speed feed and 3,000 rpm using as lubricant, (8) water; (9) perfluorotributylamine; (10) perfluro-N-methylmorpholine; (11) 1-ethoxy-nonafluoro-butane; 10 methoxy-nonafluoro-butane (12); perfluorotriamylamine (13)
Figure 9:
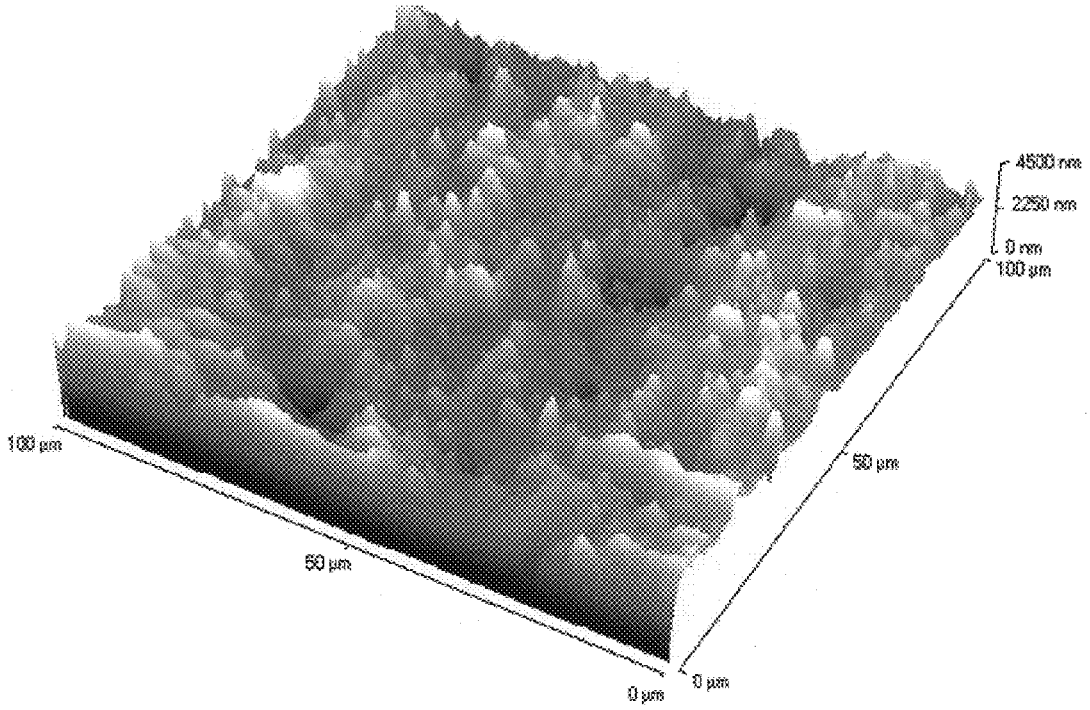
Figure 10:
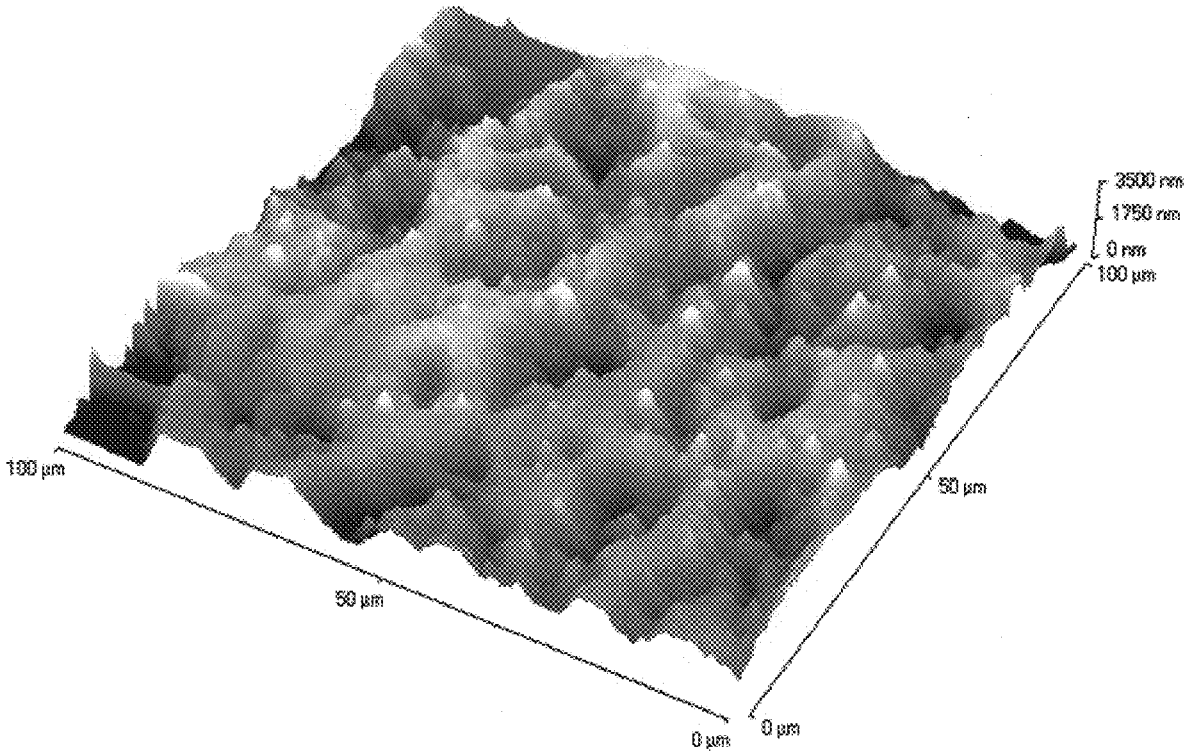
Figure 11:
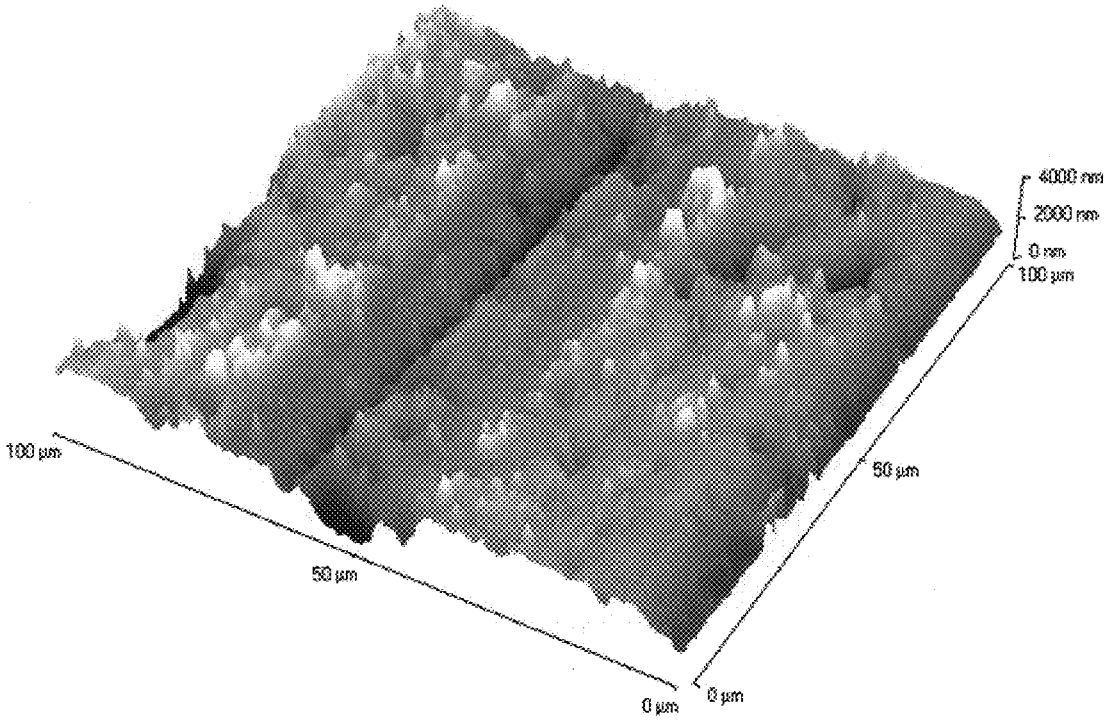
Figure 12:
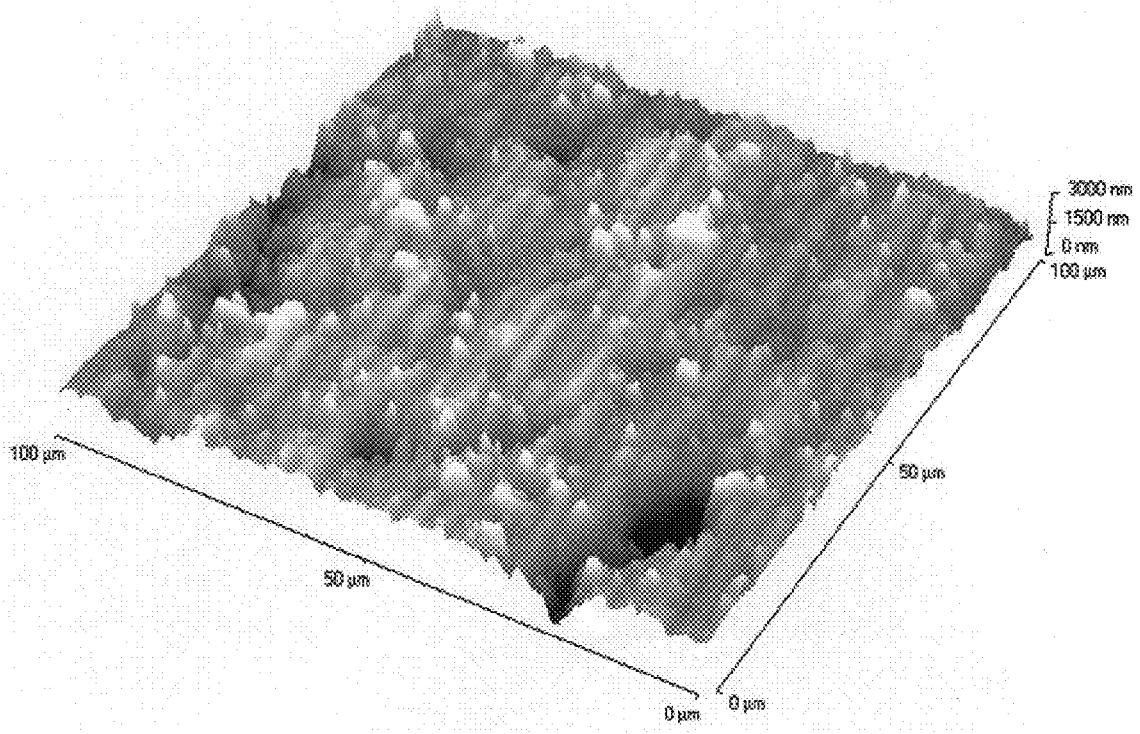
Figure 13:
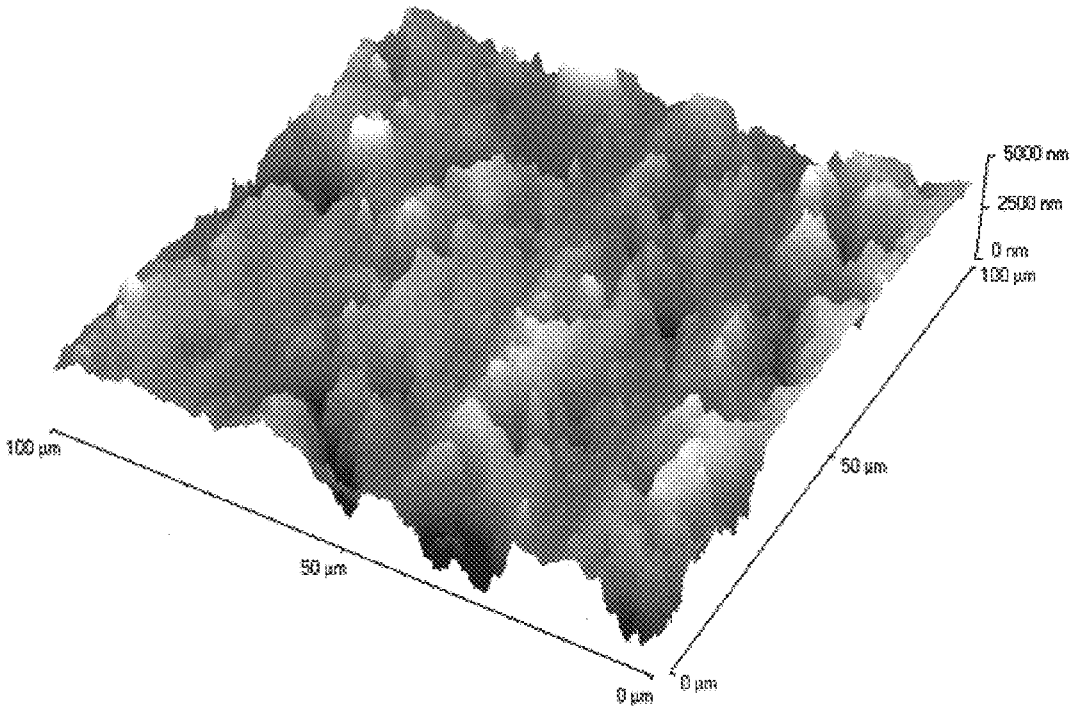
Figure 14:
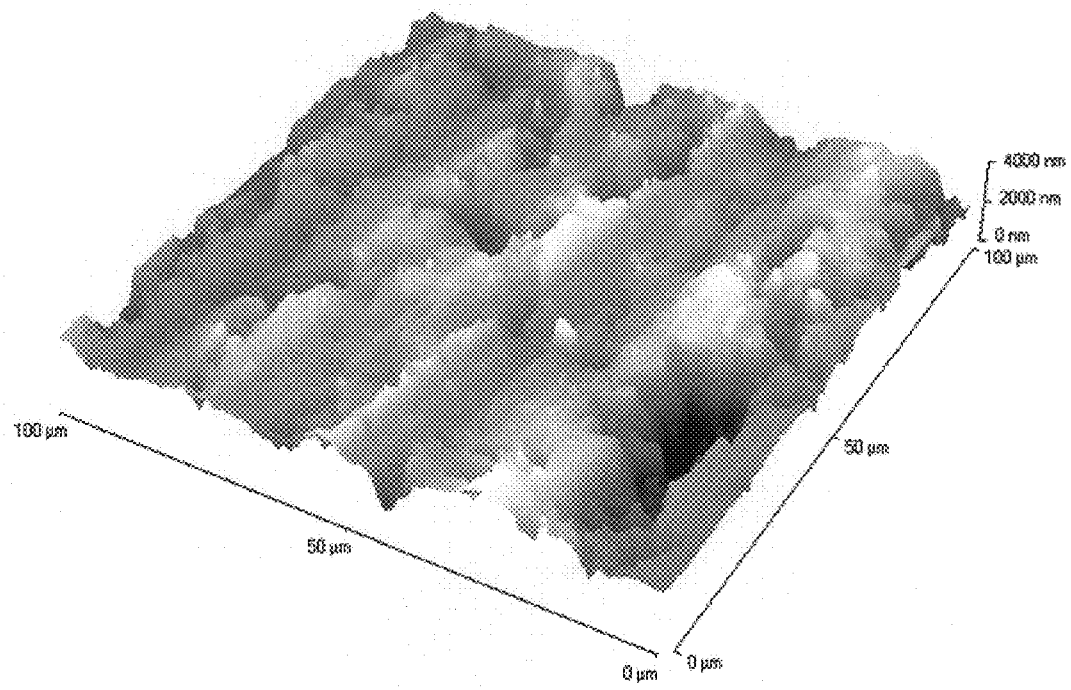
FIGS. 14–18 are similar SPMs at slower in-feed for: (14) water, (15) perfluorotributylamine, (14) perfluorotriamylamine, (15) perfluorotributylamine, (16) perfluoro-N-methylmorpholine, (17) 1-exthoxy-nonafluoro-butane, (18) 1-mexthoxy-nonafluoro-butane.
Figure 15:
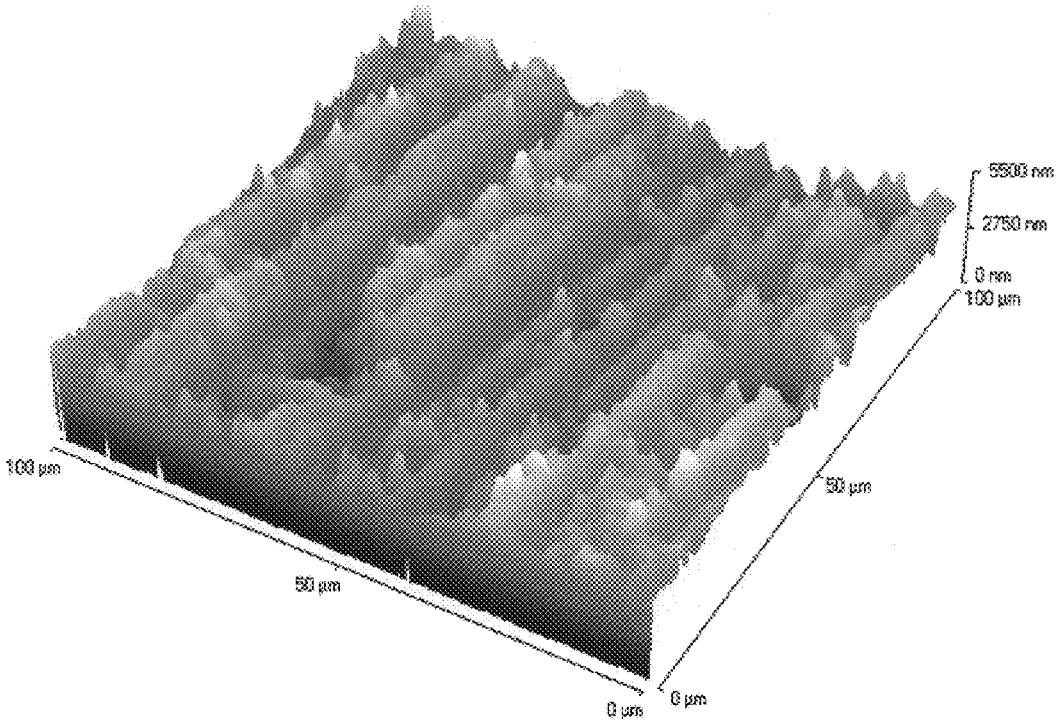
Figure 16:
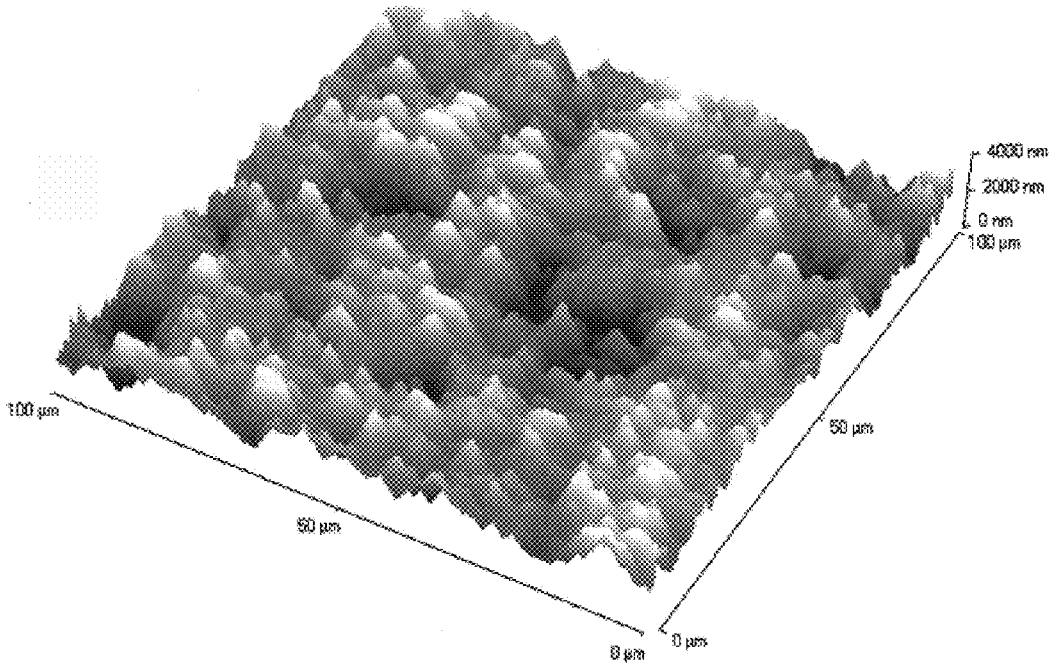
Figure 17:
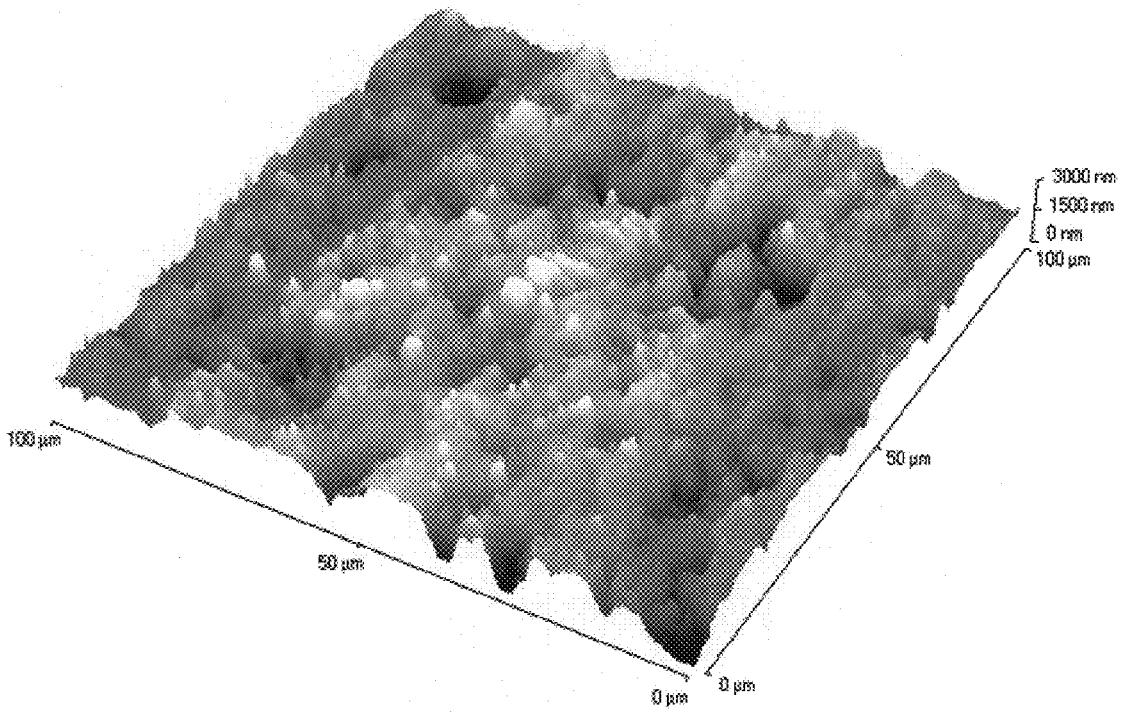
Figure 18:
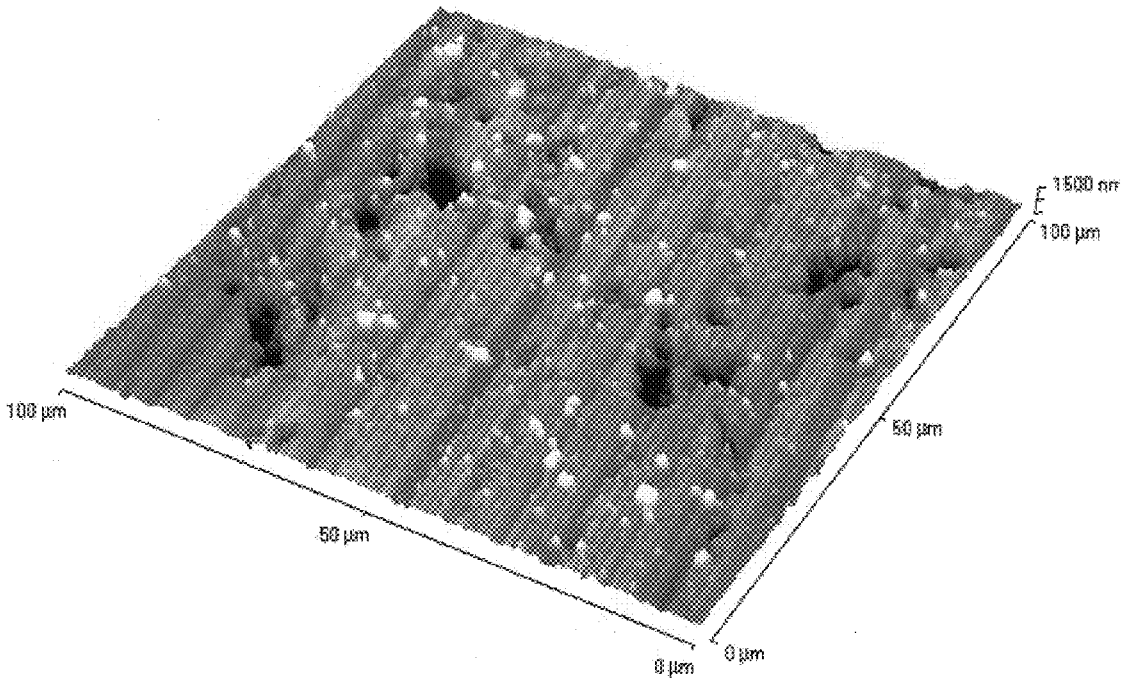

The invention is now described further with reference to working examples of its usage, the examples being provided as illustrative of and not in limitation of the invention.

EXAMPLE 1 Lithium Tantalates

An 0.875 inch diameter rod of lithium tantalate crystal was cut with an Accutom-2 laboratory scale diamond cutoff saw, using as lubricant in different runs, water and several forms of perfluorinated inert liquids to form 0.5 mm thick wafers. The lubricants were sprayed on the blade to fully wet it. The time of cutting through and rpm were varied and in most instances surface roughness were determined on a cut side of each resultant wafer (same side from sample to sample). The results are shown in Table I for Example I below, where cutting time (time) is shown in minutes: seconds, cut length (length) in inches and surface roughness (roughness) in nanometers.

TABLE I

Lithium Tantalate Cutting Tests

| Lubricant | Blade RPM | Feed Time (min:sec | Cut Length (inches) | Surface Roughness RMS/nanometers FIG. |
|---|---|---|---|---|
| Water | 3000 | 0:18 | 0.875 | 1836 |
| Perfluorotributylamine | 3000 | 0:22 | 0.875 | 2460 |
| Perfluoro-N-morpholine | 3000 | 0:22 | 0.875 | 3759 |
| 1-etholy-nonafluoro-butane | | | | No data |
| Water | 3000 | 3:26 | 0.875 | 4566 |
| Perfluorotributylamine | 3000 | 3:16 | 0.875 | 5415 |
| Perfluoro-N-morpholine | 3000 | 4:33 | 0.875 | 6712 |

TABLE I-continued

Lithium Tantalate Cutting Tests

| Lubricant | Blade RPM | Feed Time (min:sec | Cut Length (inches) | Surface Roughness RMS/nanometers FIG. |
|---|---|---|---|---|
| 1-etholy-nonafluoro-butane | 3000 | 4:35 | 0.875 | 7606 |

Example 2-Lithium Niobates

An 0.875 inch diameter rod of lithium niobate crystal was cut with an Accutom-2 laboratory scale diamond cutoff saw, using as lubricant in different runs, water and several forms of perfluorinated inert liquids to form 0.5mm thick wafers. The lubricants were sprayed on the blade to fully wet it. The time of cutting through and rpm were varied and in most instances surface roughness were determined on a cut side of each resultant wafer (same side from sample to sample). The results are shown in Table 11 for Example 2 below, where cutting time (time) is shown in minutes: seconds, cut length (length) in inches and surface roughness (roughness) in nanometers.

TABLE II

Lithium Niobate Cutting Tests

| Lubricant | Blade RPM | Feed Time (min:sec | Cut Length (inches) | Surface Roughness RMS/nanometers FIG. |
|---|---|---|---|---|
| Water | 3000 | 0:16 | 0.825 | 81047 |
| Perfluorotributylamine | 3000 | 0:16 | 1.000 | 9651 |
| Perfluoro-N-morpholine | 3000 | 0:21 | 0.875 | 10615 |
| 1-etholy-nonafluoro-butane | 3000 | 0:24 | 1.000 | 11629 |
| 1-methoxy-nanafluoro-butane | 3000 | 1:01 | 0.875 | 12425 |
| Perfluorotriamylamine | 3000 | | Broken | 13703 |
| Water | 3000 | 3:36 | 0.875 | 14589 |
| Perfluorotributylamine | 3000 | 3:45 | 1.000 | 15717 |
| Perfluoro-N-morpholine | 3000 | 1:25 | 0.875 | 16667 |
| 1-etholy-nonafluoro-butane | 3000 | 4:41 | 1.000 | 17468 |
| 1-methoxy-nonafluoro-butane | 3000 | 4:31 | 0.875 | 18213 |
| Perfluorotriamylamine | 3000 | | Broken | N/A |

It is thus seen that a substantial advance is made in the art of metallate materials. They can be cut to thin wafer forms with good speeds and reduced tool wear, consistent with good surface characteristics. Despite breakage during the tests with the amine lubricant, it should not be discarded as a selection and is usable within the scope of the invention, as are the other members of the class of inert fluorinated lubricants specified herein.

It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

What is claimed is:

1. Method of working refractory metal metallates comprising applying a cutting tool to a workpiece form of the metallate in the presence of one or more of the fluorinated lubricants selected from the group consisting of PFCs, PFAs, HFAs, PFMs, and Polymerization products of any of the foregoing.

2. Method as defined in claim 1 wherein the working method is sawing with a diamond edged wheel.

3. Method as defined in claim 1 wherein the working method is cutting.

4. Method as defined in claim 1 wherein the working method is grinding or polishing.

5. Method as defined in any of claims 2–4 and 1 wherein the metallate is in a single crystal elongated form.

6. Method as defined in any of claims 2–4 and 1 wherein the metallate is selected from the group consisting of niobates, tantalates, titanates, molybdates,tungstates, zirconates, hafnates, vanadates.

7. Method as defined in claim 6 wherein the metallate is lithium niobate.

8. Method in accordance with any of claims 1–4 wherein the lubricant is selected from the class consisting of perfluoroalkanes, perfluorocycloalkanes, perfluoroamines, and perfluoromorpholines, and the polymerization products of these materials and substituted products of any of them.

* * * * *